United States Patent [19]

Tsuruoka et al.

[11] Patent Number: 4,699,264

[45] Date of Patent: Oct. 13, 1987

[54] AUTOMATIC HANGING UP AND TAKING DOWN DEVICES FOR AUTOMOBILE WHEELS

[75] Inventors: Kouichi Tsuruoka, Kawanishi; Takaaki Kannan, Suita; Jiro Suematu, Osaka, all of Japan

[73] Assignees: Kanai Sharin Kogyo Kabushiki Kaisha, Toyonaka; Kabushiki Kaisha Kasho, Nishi, both of Japan

[21] Appl. No.: 902,956

[22] Filed: Sep. 2, 1986

[30] Foreign Application Priority Data

Sep. 4, 1985 [JP] Japan ............................... 60-195022
Sep. 5, 1985 [JP] Japan ............................... 60-196498

[51] Int. Cl.⁴ ...................... B65G 37/00; B65G 43/10
[52] U.S. Cl. ............................... 198/468.2; 198/468.6; 198/575
[58] Field of Search ...................... 198/468.6, 575, 576, 198/680, 486.1, 468.2, 464.3, 464.1, 571; 414/331, 908, 910

[56] References Cited

U.S. PATENT DOCUMENTS

| | | | |
|---|---|---|---|
| 2,850,141 | 9/1958 | Bishop et al. | 198/575 X |
| 2,885,063 | 5/1959 | Austin et al. | 198/464.3 |
| 2,918,164 | 12/1959 | Austin et al. | 198/468.6 X |
| 2,960,206 | 11/1960 | Dougherty | 198/464.3 |
| 3,202,261 | 8/1965 | Pianowski | 198/468.6 X |
| 3,856,129 | 12/1974 | Baur et al. | 198/468.6 |
| 3,888,361 | 6/1975 | Becker et al. | 198/468.6 X |

FOREIGN PATENT DOCUMENTS

| | | | |
|---|---|---|---|
| 688395 | 9/1979 | U.S.S.R. | 198/468.1 |
| 1079560 | 3/1984 | U.S.S.R. | 198/468.6 |

Primary Examiner—Joseph E. Valenza
Assistant Examiner—David A. Bucci
Attorney, Agent, or Firm—Wenderoth, Lind & Ponack

[57] ABSTRACT

Automatic hanging up and taking down devices for automobile wheels which aim at perfect automation of an automobile wheel coating process. The hanging up device carries out automatic and simultaneous hanging of a plurality of wheels on a hanger suspended from a trolley conveyor by a wheel gripping mechanism comprising a truck which is movable in parallel with a trolley conveyor and a main frame arranged in such a fashion that it is movable in a direction at a right angle to a moving direction of the trolley conveyor. The taking down device carries out automatic taking down of a plurality of wheels hung on the hanger.

3 Claims, 6 Drawing Figures

AUTOMATIC HANGING UP AND TAKING DOWN DEVICES FOR AUTOMOBILE WHEELS

BACKGROUND OF THE INVENTION

1. Field of the Invention

This invention relates to automatic hanging up and taking down devices for automobile wheels in an automobile hung on and taken down from a hanger suspended from a trolley conveyor, without stopping the movement of a trolley conveyor.

2. Description of the prior art

Heretofore, in an automobile wheel coating process wheels to be coated are hung on and taken down from a hook of a hanger one by one manually. This manual operation, however, is attended with danger because fairly heavy wheels are handled manually while a trolley conveyor is travelling. Moreover, in hanging up a wheel by hands it is difficult to hang it on a hook of a hanger correctly and this can cause irregular coating and in taking down a wheel by hands after the coating process, the wheel is liable to be caught by a hook, with resultant scratches on coated wheels

SUMMARY OF THE INVENTION

The present invention has for its object to solve the above problems. It provides automatic hanging up and taking down devices for automobile wheels, aiming at a perfect automation of a wheel coating process and production of wheels of high quality, free from irregular coating and coating scratches. It is composed of a wheel gripping mechanism comprising a truck which is reciprocated on two rails in parallel with a moving direction of a hanger suspended from a trolley conveyor, a hanger clamper which is mounted on the truck to hold a lower end of the hanger, a main frame which is mounted on the truck and moves back and forth at a right angle to a moving direction of the trolley conveyor and a support plate which is disposed on the main frame for gripping or setting free a wheel.

BRIEF DESCRIPTION OF THE DRAWINGS

The present invention will be more apparent from the following description of preferred embodiments made with reference to the accompanying drawings, in which.

DETAILED DESCRIPTION OF THE INVENTION

Embodiment 1

Figure 1:
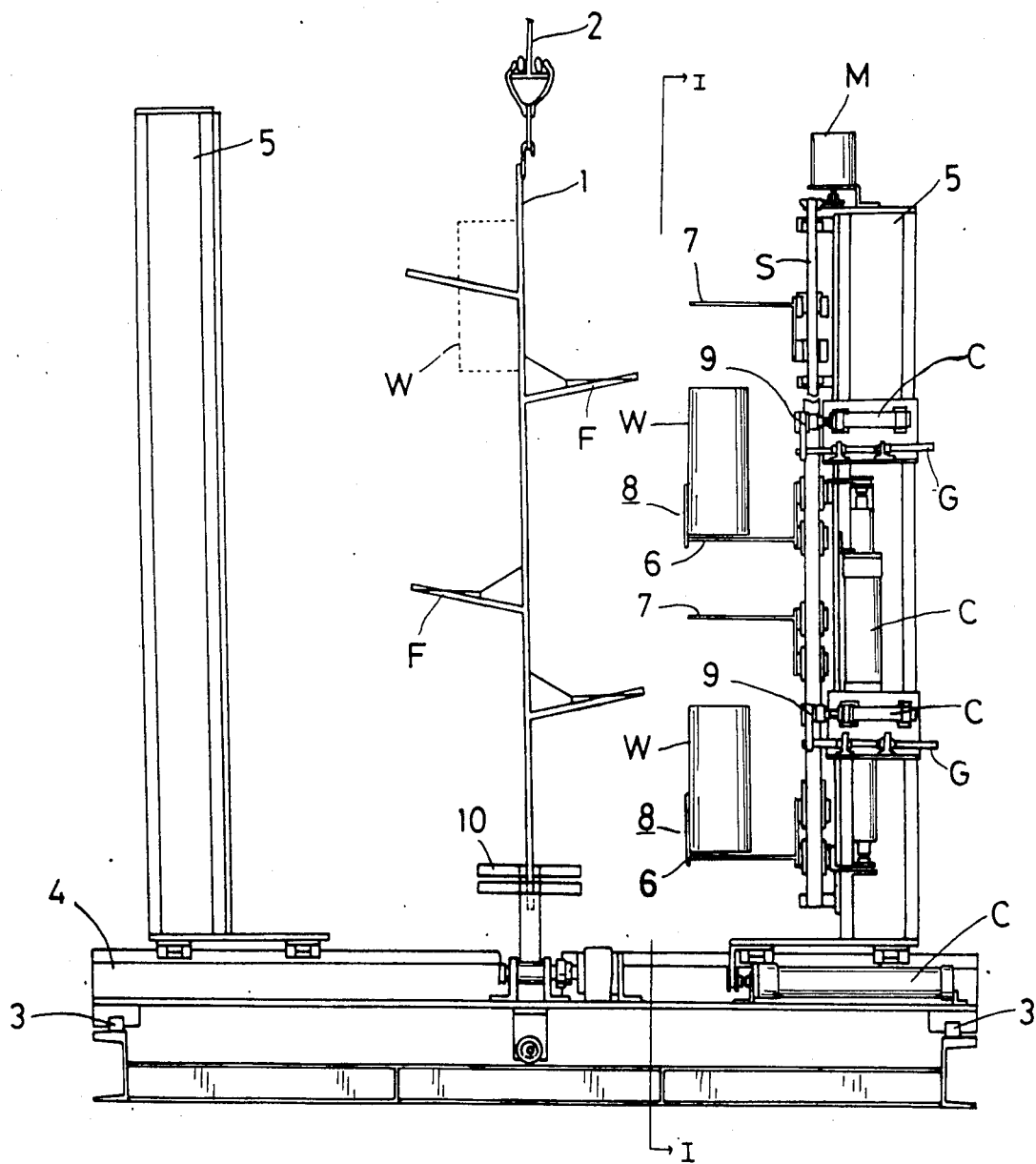
FIG. 1 is a side view of an automatic hanging up device according to the present invention, partly omitted.
Figure 2:
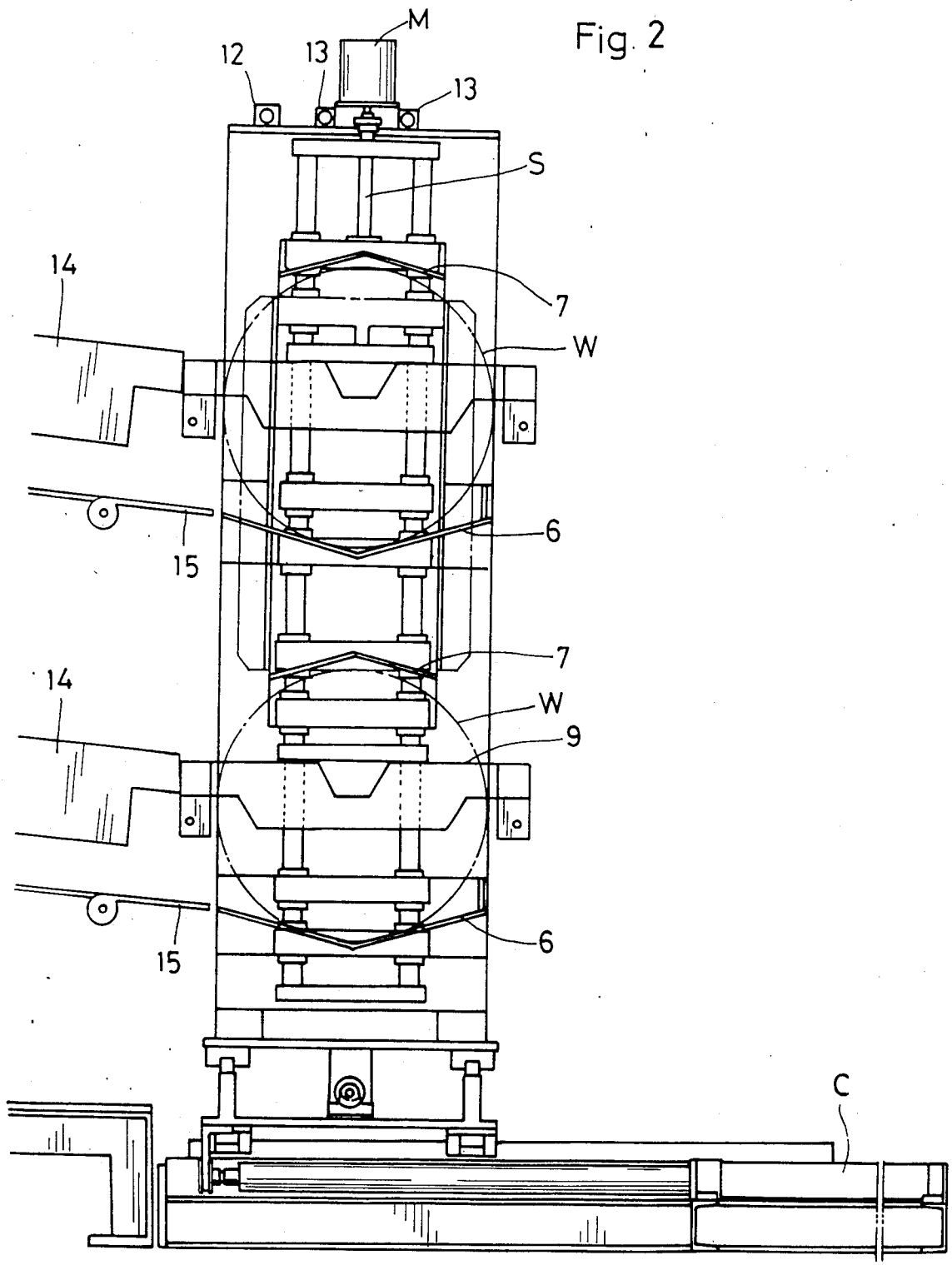
FIG. 2 is a front view of the hanging up device as viewed from the line I—I in FIG. 1.
Figure 3:
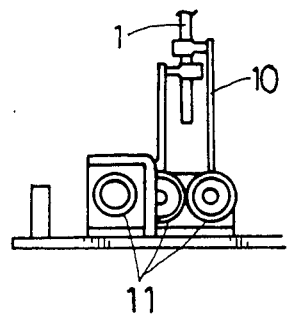
FIG. 3 is a front view of one example of a hanger clamper opening and shutting mechanism.

One embodiment of an automatic wheel hanging up device according to the present invention is described below with reference to FIG. 1 to FIG. 3.

Two rails 3 are arranged below a trolley conveyor 2 which moves with a hanger 1 on which a wheel is hung and in parallel with a moving direction of the trolley conveyor.

A truck 4 is mounted on the rails 3 in such a fashion that it can move in parallel with and in synchronism with the trolley conveyor by a hydraulic cylinder, an air cylinder or the like. Two main frames 5 are arranged oppositely, with the trolley conveyor therebetween, on the truck 4.

It is so designed that the main frame 5 moves back and forth on the truck 4 at a right angle to a moving direction of the trolley conveyor 2. The main frame 5 has a wheel gripping mechanism 8 comprising clampers 6 and support plates 7, between which a wheel is gripped. The number of this gripping mechanism depends upon the number of hooks F of the hanger 1 but in the drawing two sets are arranged in a vertical direction.

In the drawing, the clamper 6 is formed substantially in V-shape so as to receive a wheel and keep it from falling down but can take any other structure so far as it holds a wheel stably. It is so designed that the clamper 6 is movable vertically by a hydraulic cylinder, an air cylinder or the like so as to grip a wheel firmly with the support plate 7.

The support plate 7 is formed substantially in V-shape. This plate is of the same nature as the clamper 6, namely, in the case where the diameter of wheels to be coated was changed, support plates 7 (two in this embodiment) are moved vertically and synchronously by a pulse motor M via a screw shaft S so as to adjust the space between the support plate 7 and the clamper 6.

A pressing means is arranged substantially midway between the clamper 6 and the support plate 7 and slightly behind them. This pressing means is so constructed that a pressing plate 9 is moved back and forth by a hydraulic cylinder, an air cylinder C or the like along a guide shaft G and a wheel is pressed against the hanger 1. A hanger clamper 10 is disposed on the truck 4 in such a fashion that it is situated below the trolley conveyor 2. This hanger clamper 10 opens and shuts by means of gears 11 (FIG. 3) to be driven by an electric motor (not shown in the drawing) and grips accurately the lower end of the hanger 1 suspended from the trolley conveyor 2 so as to keep the hanger from swinging.

Provided at the upper part of the main frame 5 are a phototube 12 which detects the hanger 1 having been positioned at the center of the main frame 5 and one set of phototubes 13 which detect the inclination of the hanger 1. Each device is operated by signals detected by phototubes 12, 13.

Provided close to the clamper 6 of the wheel gripping mechanism 8 is a shooter 14 having at the top end portion thereof a stopper 15 which opens and shuts in linkage with the clamper 6. The stopper 15 is brought down to open the shooter when a wheel W is supplied onto the clamper 6 as it is rolling down the shooter 14 and at the same time, the stopper 15 returns to its original position, namely, the shooter is closed.

Each device of the present invention is generally moved back and forth and vertically by hydraulic pressure and air pressure but an electric motor or an electric pulse motor is used, in some cases, for some of the devices.

In the drawing, an automatic hanging up device of one of the main frames is shown and the other main frame and the other main frame is not shown but the latter should have the same arrangement.

The wheel W is gripped between the clamper 6 and the support plate 7 when the wheel is supplied from the shooter onto the clamper 6 of the wheel gripping mechanism 8 and the clamper 6 is raised by a hydraulic cylinder, an air cylinder or the like. At this time, the stopper 15 provided at the shooter 14 is shut in linkage with the rise of the clamper and thus the next wheel stops at the stopper 15 and assumes a posture of standing by. When an empty hanger 1 (with no wheel) approaches the automatic hanging up device by the movement of the trolley conveyor 2, such approach of the empty hanger 1 is detected by the phototube 12 provided at the main frame 5, whereupon the truck 4 begins to move in the same direction as a moving direction of the trolley conveyor 2 at the speed set beforehand (the same speed as the moving speed of the trolley conveyor 2). At almost the same time as the start of the movement of the truck 4, the hanger clamper 10 grips the lower end of the hanger 1 so as to keep the hanger from swinging.

The speed of the trolley conveyor 2 changes every moment with the change of load on a coating process as a whole and if the difference between the moving speed of the trolley conveyor and that of the automatic hanging up device becomes large, the hanger inclines. The inclination of the hanger can cause misses of wheel hanging up and bad hanging up of wheels, with resultant irregularity of coating. In view of this, one set of phototubes 13 to detect any inclination of the hanger is provided. When the hanger inclines and intercepts the phototubes, the hydraulic cylinder is actuated and the speed of the truck 4 is adjusted automatically. Thus, the trolley conveyor and the automatic hanging up device advance side by side and synchronously. At the same time, the main frame 5 advances on the truck 4 up to the position where the front surface of the clamper 6 holding a wheel makes contact with the hanger 1 and a hub hole of the wheel W is put on the hook F of the hanger 1, whereupon the pressing means of the main frame 5 actuates and the pressing plate 9 presses the wheel to the innermost part of the hook F.

Then, upon retreating the pressing plate 9 to its original position, the clamper 6 is lowered and the wheel hanging up operation is finished.

Preferably, it is possible to hang a wheel accurately on the innermost part of the hook by forcing out the pressing plate 9 again, while retreating the main frame, and by pressing a wheel W against the hanger 1.

Then, at the same time as the start of the retreatment of the main frame or after finishing of retreatment, movement of the truck is suspended and the truck is returned to its starting point and waits for the next wheel to be hung up.

By repeating these operations, wheels can be hung correctly on the hanger without attendance of operatives.

Embodiment 2

Figure 6:
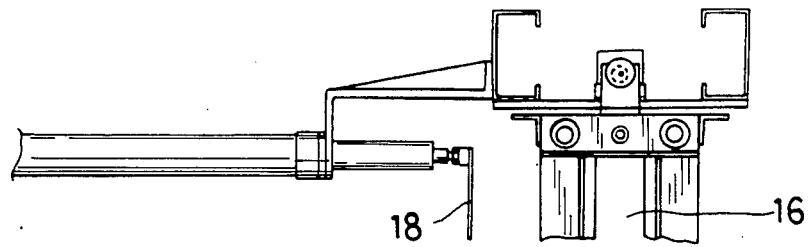
FIG. 6 is a plan view of the automatic taking down device shown in FIG. 4, as viewed from the line V—V in FIG. 5.
Figure 4:
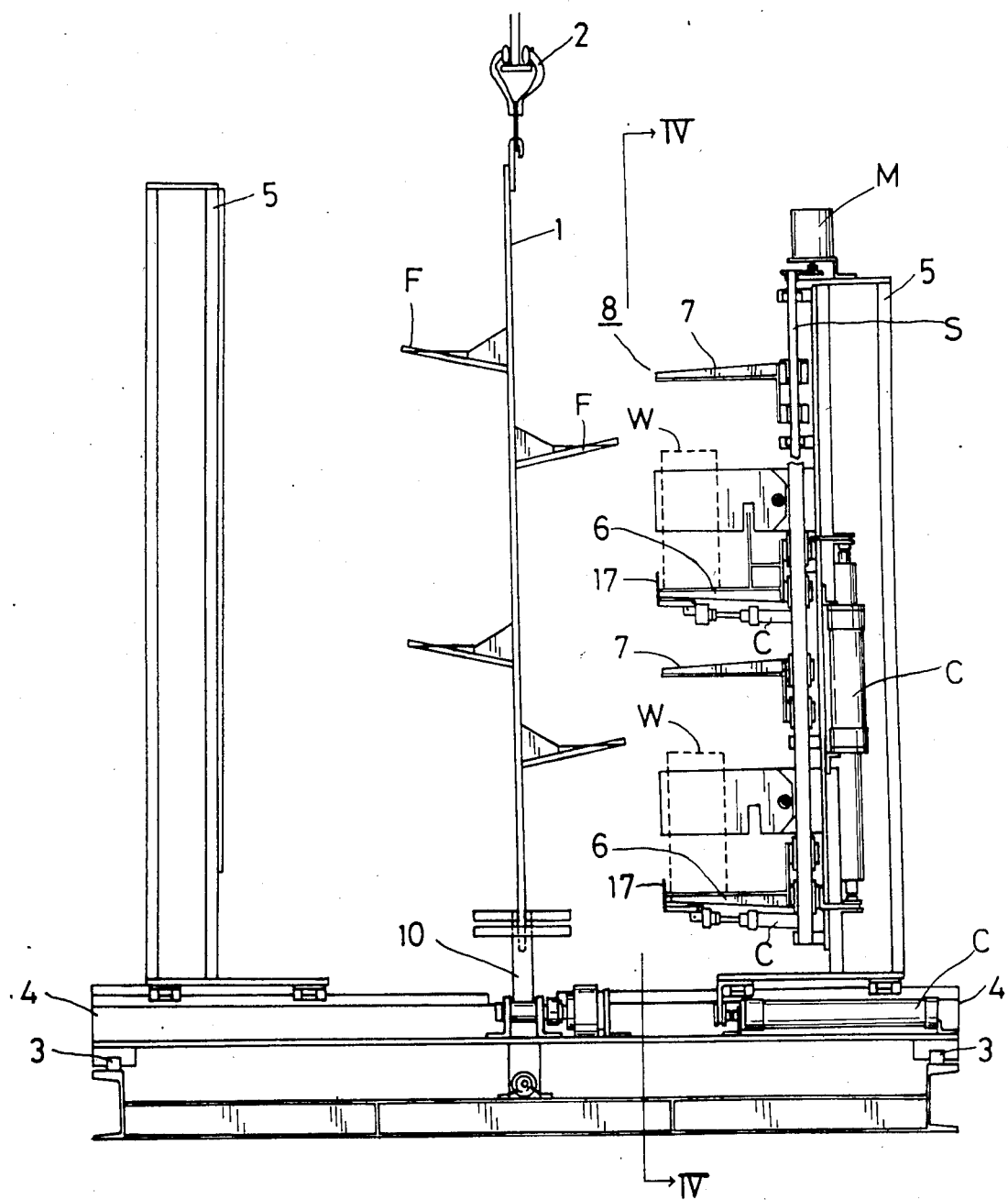
FIG. 4 is a side view of an automatic taking down device according to the present invention, partly omitted.
Figure 5:
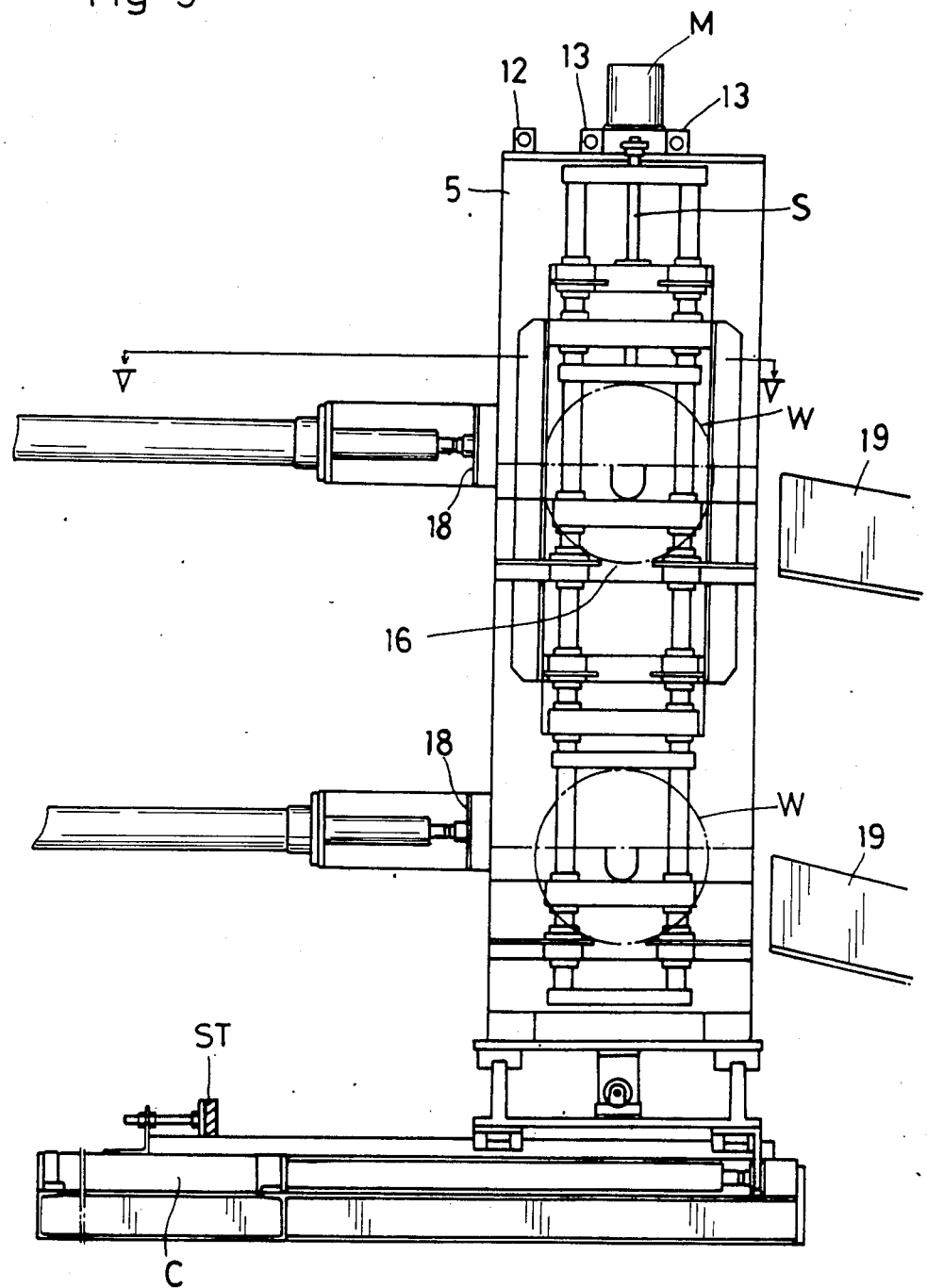
FIG. 5 is a front view of the automatic taking down device shown in FIG. 4, as viewed from the line IV—IV in FIG. 4.

One embodiment of the automatic wheel taking down device according to the present invention is described below on the basis of FIG. 4–FIG. 6.

Two rails 3 are arranged below the trolley conveyor 2 which moves with the hanger 1 on which a wheel is hung suspended, in parallel with a moving direction of the trolley conveyor 2. The truck 4 is mounted on the rails 3 in such a fashion that the truck can advance in synchronism with the trolley conveyor 2 by a hydraulic cylinder, an air cylinder or the like. Two main frames 5 are arranged oppositely on the truck 4, with the trolley conveyor 2 therebetween. In the drawing, ST denotes a stopper.

The main frame 5 is provided on the truck 4 in such a fashion that the main frame can move back and forth at a right angle to a moving direction of the trolley conveyor 2.

The main frame 5 has the wheel gripping mechanism 8 comprising the clamper 6 and the support plate 7 which grips a wheel W with the clamper 6. The number of wheel gripping mechanism 8 depends upon the number of hooks F of the hanger 1. In the drawing, 2 sets of such mechanism are arranged in vertical direction.

The clamper 6 has a slit 16 at its substantially central part in axial direction of the wheel and is so shaped that it keeps a wheel received thereon from falling down. However, it can take any structure so far as it holds a wheel stably.

The clamper 6 is movable in vertical direction so that it can grip a wheel with the support plate 7. A guide 17 is provided at a forward end of the clamper 6 in such a fashion that it is swingable by hydraulic pressure.

The support plate 7 is so constructed that when the diameter of wheels to be handled is changed, it is moved vertically by a pulse motor M, via a screw shaft S, so as to adjust the space between the support plate 7 and the clamper 6.

A pressing means is arranged at the side of the clamper 6 and the support plate 7. This pressing means is so constructed that a pressing plate 18 is moved back and forth by a hydraulic cylinder, an air cylinder or the like so as to push out a wheel from the wheel gripping mechanism 8 onto a discharging conveyor 19.

A wheel on the discharging conveyor 19 is fed to the succeeding process. The hanger clamper 10 is mounted on the truck 4 in such a fashion that it is situated below the trolley conveyor 2. The hanger clamper 10 opens and shuts by means of the gears 11 to be driven by an electric motor and grips accurately the lower end of the hanger 1 suspended from the trolley conveyor 2 so as to keep the hanger from swinging. Provided at the upper part of the main frame 5 are the phototube 12 which detects the hanger 1 having been positioned at the center of the main frame 5 and one set of phototubes 13 which detect the inclination of the hanger 1. Each device is operated by signals detected by phototubes 12, 13.

Each device of the present invention is generally moved back and forth and vertically by hydraulic pressure or by air pressure but an electric motor or an electric pulse motor is used, in some cases, for some of the devices.

In the drawing, an automatic taking down device of one of the main frames is shown but the other main frame should have the same arrangement.

When the hanger 1 on which a coated wheel which passed through a coating process is hung approaches the automatic taking down device by movement of the trolley conveyor 2, such approach is detected by the phototube 12 arranged at the main frame and the truck 4 of the automatic taking down device begins to move in the same direction as a moving direction of the trolley conveyor 2 at the speed set beforehand (the same speed as the moving speed of the trolley conveyor 2). At almost the same time as the start of the movement of the truck, the hanger clamper 10 grips the lower end of the hanger 1 so as to keep the hanger from swinging.

The speed of the trolley conveyor 2 changes every moment with the change of load on the coating process as a whole and if the difference between the moving speed of the trolley conveyor and that of the automatic taking down device becomes large, the hanger inclines. The inclination of the hanger can cause miss of taking down, with the result that the hanger is fed to the succeeding process with a wheel hung thereon. In view of this, one set of phototubes 13 to detect any inclination of the hanger is provided at the main frame 5. When the hanger inclines and intercepts the phototubes, a hydraulic cylinder, an air cylinder or the like is actuated and the speed of the truck 4 is adjusted automatically. Thus, the trolley conveyor and the automatic taking down device advance side by side and synchronously. At the same time, the main frame 5 on the truck 4 advances toward the hanger 1 on which a wheel W is hung and advances further up to the position where the front surface of the clamper 6 makes contact with the hanger 1.

Then, the clamper is raised to grip a wheel between it and the support plate. At this time, the wheel is lifted up and the hub hole of the wheel comes off the hook F of the hanger.

Then, the guide 17 of the clamper is raised and the wheel is detached from the hanger while the main frame 5 is retreated. At this time, the hanger clamper 10 is released and the hanger is set free. The truck 4 is released from synchronism with the trolley conveyor 2 and advances up to the position where a wheel is taken down and stops there.

Then, the clamper is lowered and the wheel mounted on the clamper 6 is pushed out onto a discharging conveyor 19 by a pressing plate 18. While the truck 4 is returned to its movement starting point, the guide 17 is lowered ready for the next wheel to be taken down.

By repeating these operations, wheels can be taken down accurately from the hanger without attendance of operatives.

In the above embodiments 1 and 2, two automatic hanging up devices and two automatic taking down devices are provided, with the trolley conveyor therebetween, but it is possible to provide only one device as occasion requires.

Since the devices according to the present invention are constructed as described above, a plurality of wheels can be hung up and taken down simultaneously, without suspending the movement of the trolley conveyor. Therefore, hanging up and taking down operations at a coating process can be carried out without attendance of operatives, namely, perfect automation of a coating process can be realized. Moreover, as the present invention provides accurate hanging up and taking down of wheels, it contributes to the production of finished wheels of high quality which are free from irregular coating and scratches on coated wheels.

What is claimed is:

1. Automatic hanging up and taking down devices for automobile wheels, each device comprising a truck mounted on two rails in such a fashion that it moves reciprocally in parallel with a moving direction of a hanger suspended from a trolley conveyor, a hanger clamper mounted on said truck so as to grip a lower end of said hanger, a main frame which is mounted on said truck and moves back and forth at a right angle to a moving direction of the trolley conveyor, and a wheel gripping mechanism composed of clampers and support plates which are disposed on the main frame for releasing and gripping wheels.

2. An automatic hanging up device for automobile wheels provided with a truck mounted on two rails in such a fashion that it moves reciprocally in parallel with a moving direction of a hanger suspended from a trolley conveyor, a hanger clamper mounted on said truck so as to grip a lower end of said hanger, a main frame which is mounted on said truck and moves back and forth at a right angle to a moving direction of the trolley conveyor, a wheel gripping mechanism which is composed of clampers and support plates for releasing and gripping wheels, a shooter to supply wheels to said wheel gripping mechanism, and a pressing means to press wheels from said wheel gripping mechanism to the hanger.

3. An automatic taking down device for automobile wheels provided with a wheel gripping mechanism comprising a truck mounted on two rails in such a fashion that it moves reciprocally in parallel with a moving direction of a hanger suspended from a trolley conveyor, a hanger clamper mounted on said truck so as to grip a lower end of said hanger, a main frame which is mounted on said truck and moves back and forth at a right angle to a moving direction of the trolley conveyor, a wheel gripping mechanism which is composed of clampers and support plates for releasing and gripping wheels, and a wheel pushing out means to push out wheels from said wheel gripping mechanism onto a discharging conveyor.

* * * * *